(12) United States Patent
Jalil et al.

(10) Patent No.: US 7,746,839 B2
(45) Date of Patent: Jun. 29, 2010

(54) METHOD AND SYSTEM FOR MANAGING COMMUNICATION IN AN OFDMA SYSTEM

(75) Inventors: Rehan Jalil, San Jose, CA (US); Mustafa Ergen, Oakland, CA (US)

(73) Assignee: Wichorus Inc, San Jose, CA (US)

( * ) Notice: Subject to any disclaimer, the term of this patent is extended or adjusted under 35 U.S.C. 154(b) by 416 days.

(21) Appl. No.: 11/754,381

(22) Filed: May 29, 2007

(65) Prior Publication Data

US 2009/0010344 A1 Jan. 8, 2009

Related U.S. Application Data

(60) Provisional application No. 60/809,704, filed on May 30, 2006.

(51) Int. Cl.
*H04J 1/00* (2006.01)
(52) U.S. Cl. ....................... 370/343; 370/480
(58) Field of Classification Search ................. 370/260, 370/310.2, 318, 319, 329, 344, 390, 537, 370/343, 480
See application file for complete search history.

(56) References Cited

U.S. PATENT DOCUMENTS

2003/0119517 A1* 6/2003 Dhainaut .................... 455/447
2005/0074030 A1* 4/2005 Cho et al. .................... 370/474
2006/0018347 A1* 1/2006 Agrawal ..................... 370/537
2007/0253367 A1* 11/2007 Dang et al. .................. 370/329

* cited by examiner

*Primary Examiner*—Kevin C Harper
*Assistant Examiner*—Leon Andrews
(74) *Attorney, Agent, or Firm*—Prakash Nama; Global IP Services, PLLC

(57) ABSTRACT

The present invention provides method and system for managing communication in an orthogonal frequency division multiple access (OFDMA) system using segments in an OFDMA frame. The method includes setting at least a first segment in the OFDMA frame as a high power segment for a plurality of base station in the OFDMA system. Further, communication is established between at least one base station and at least one communication device in the OFDMA system, in response to setting the at least first segment as a high power segment. The method further includes assigning a region of the first segment to a set of base stations in the OFDMA system. The assigned region can be used by the set of base stations at high power level to communicate with communication devices located in overlapping areas. A method for coordinating uplink transmission in the OFDMA system for reducing uplink interference is also provided.

15 Claims, 6 Drawing Sheets

METHOD AND SYSTEM FOR MANAGING COMMUNICATION IN AN OFDMA SYSTEM

RELATED APPLICATIONS

Benefit is claimed under 35 U.S.C. 119(e) to U.S. Provisional Application Ser. No. 60/809,704, entitled "Method and system for coordinated OFDMA based single frequency network in IEEE 802.16 with multicast broadcast and macro-diversity support", by Rehan Jalil et al., filed May 30, 2006, which is herein incorporated in its entirety by reference for all purposes.

FIELD OF THE INVENTION

The present invention is generally related to a method for managing communication in an orthogonal frequency division multiple access (OFDMA) system, and more particularly, to methods for reducing interference in uplink transmission and for enabling multi-base station Multicast Broadcast Service (MBS) communication and Macro Diversity Handover (MDHO) in all OFDMA system.

BACKGROUND OF THE INVENTION

Communication systems are widely deployed to provide various types of communication such as voice, data, and so on, for a number of users. These communication systems are based on code division multiple access systems (CDMA), time division multiple access (TDMA), frequency division multiple access (FDMA), or Orthogonal frequency division multiple access (OFDMA).

In a typical communication system, a network is divided into a plurality of cells, such that each cell area of a cell is serviced by a base station. Specifically, a communication device located in a cell area associates with a base station servicing that cell area. The base station, then, enables the communication device to communicate with other communication devices in the communication system. The communication device can also be associated with two or more base stations at the same time. This, usually, happens when the communication device is located in an overlapping portion of the cell areas of the two or more base stations.

In an OFDMA system, a base station communicates with a communication device using a frame. The frame is divided into a downlink sub-frame and an uplink sub-frame. The base station transmits data to the communication device on the downlink sub-frame and receives data from the communication device on the uplink sub-frame.

Further, in an OFDMA mode of IEEE 802.16d/e or WiMAX, the frame comprises three segments, each with a different portion of a given frequency. In order to use a single frequency in the network, a group of adjacent base stations in the OFDMA system use different segments at high power level at different time slots for communication so as to minimize downlink and uplink interference. Thus, each base station can use one segment at a high power level and two segments at a low power level and no adjacent base stations, that share a portion of an overlapping area, use the same segment simultaneously at a high power level. A segment that is used at a high power level can service communication devices in the overlapping area of the cell area and the segments used at a low power level can service only the communication devices in a non-overlapping area of the cell area. The overlapping area can be defined as a portion of the cell area which has a possibility of overlapping with a neighboring cell area. Similarly, the non-overlapping area can be defined as a portion of the cell area which has very less possibility of overlapping with a neighboring cell area.

In existing OFDMA systems, when a communication device located in the overlapping area of a base station carries out an uplink transmission on a segment, the uplink transmission may interfere with another uplink transmission on the same segment in a non-overlapping area of a neighboring base station as the communication devices transmit at full power.

Further, for a multi-base station MBS communication, two or more base stations are required to transmit data simultaneously on the downlink transmission to a communication device in an overlapping area using the same sub channels of a segment. However, conventionally, the overlapping area is serviced by neighboring base stations using different segments at the high power level. Thus, even for communication devices in overlapping area, MBS communication cannot be facilitated by two or more base stations simultaneously, resulting in a single-base station MBS communication.

Also, the existing OFDMA systems do not facilitate macro diversity handover (MDHO). MDHO is a handover mechanism where a communication device receives same data from two or more base stations at the same time, so that the signals merge and a strong effective signal is obtained.

In addition, the existing OFDMA systems provides limited scalability as a base station can communicate with a communication device located in the overlapping area using only one segment, which is at a highest power. Thus, if the number of communication devices in the overlapping area is more than the number of regions in the segment that can be allocated, some of the communication devices may experience transmission interruptions.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
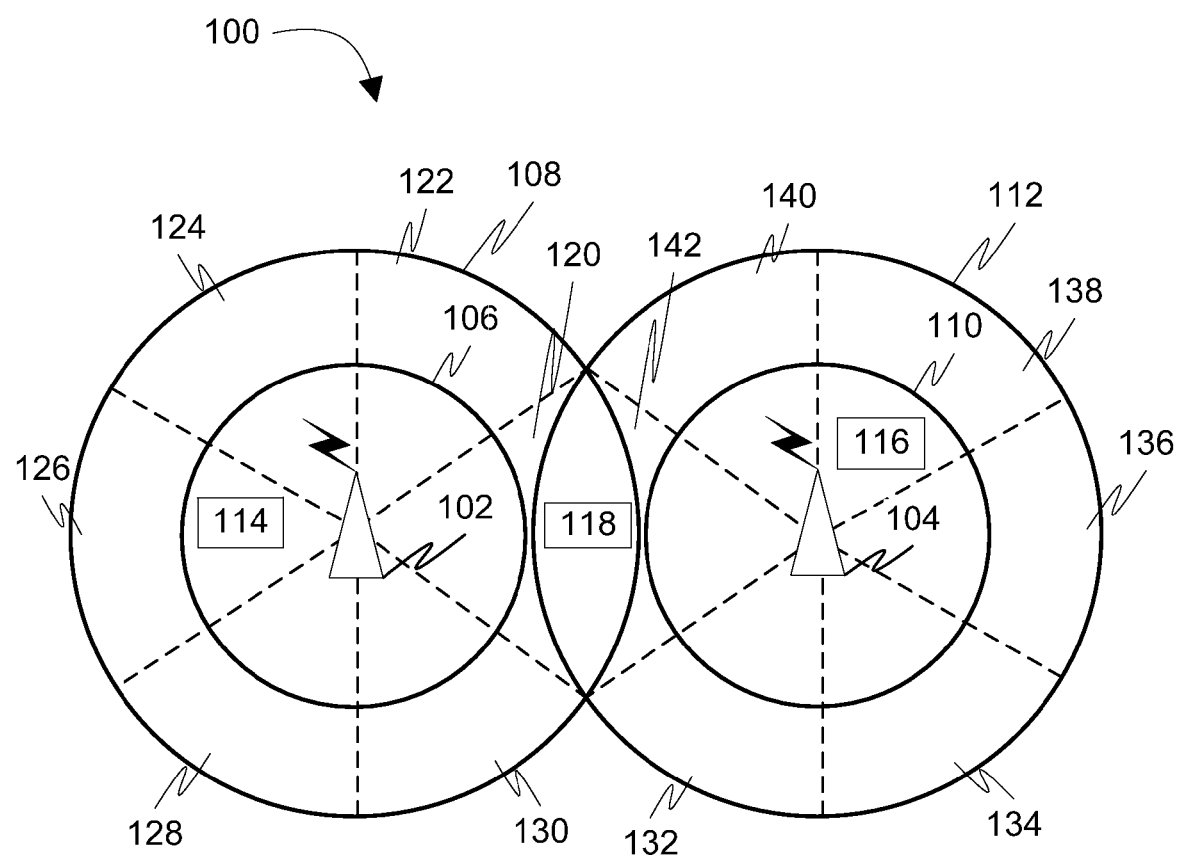
FIG. 1 is a block diagram shoveling an exemplary environment in which various embodiments of the present invention can function.

As required, detailed embodiments of the present invention are disclosed herein; however, it is to be understood that the disclosed embodiments are merely exemplary of the present invention, which can be embodied in various forms. Therefore, specific structural and functional details disclosed herein are not to be interpreted as limiting, but merely as a representative basis for teaching one skilled in the art to variously employ the present invention in virtually any appropriately detailed structure. Further, the terms and phrases used herein are not intended to be limiting but rather to provide an understandable description of the present invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Generally speaking, pursuant to various embodiments, the present invention provides a method and system for managing communication in an OFDMA system. The present invention also provides a method for coordinating uplink transmission in the OFDMA system to reduce uplink interference. The OFDMA system comprises a plurality of base stations and a plurality of communication devices. A plurality of segments is used for communication in the OFDMA system. For instance, in the OFDMA mode of IEEE 802.16 d/e, a single frequency is enough to deploy a network. Three segments of the frequency may be used by the plurality of base stations to communicate with the plurality of communication devices. Each segment further comprises a plurality of regions for establishing uplink and downlink transmission between the plurality of base stations and the plurality of communication devices in the OFDMA system. Each or the plurality of regions is, basically, a set of sub-channels of the segments. Those skilled in the art will realize that the plurality of segments and the plurality of regions are virtual partitions of a frequency used in the OFDMA system.

In accordance with an embodiment of the present invention, a single segment is set as a high power segment for all of the plurality of base stations. Therefore, communication is established between a base station and a communication device in an overlapping area using the first segment. However, the plurality of base stations can use other segments in the OFDMA system at low power level to communicate with communication devices in the non-overlapping areas. Further, another embodiment of the present invention relates to coordination of uplink transmission in the OFDMA system. The methods and systems for managing communication in the OFDMA system and for coordinating the uplink transmission are explained in detail in conjunction with FIG. 1 to FIG. 6 below.

Referring now to drawings, and more specifically to FIG. 1, an exemplary environment 100 in which various embodiments of the present invention can function is shown. Environment 100 comprises a base station 102 and a base station 104. Base station 102 services a non-overlapping area 101 and an overlapping area 108. Similarly, base station 104 services a non-overlapping area 110 and an overlapping area 112. As mentioned earlier, a non-overlapping area is a portion of a cell area of a base station which has very less possibility of overlapping with a neighboring cell area of a neighboring base station. Similarly, an overlapping area is a portion of a cell area of a base station which has a possibility of overlapping with a neighboring cell area of a neighboring base station. For instance, environment 100 can have a plurality of base stations; such as base station 104, surrounding base station 102. Cell areas of this plurality of surrounding base stations can overlap the cell area of base station 102 on overlapping area 108. Similarly, cell areas of a plurality of base stations surrounding base station 104 can overlap overlapping area 112 of base station 104.

Environment 100 further comprises a communication device 114, a communication device 116 and a communication device 118. Communication device 114, communication device 116 and communication device 118 can be for example, mobile phones, laptops, personal digital assistants, or any such devices which communicate based on OFDMA system. Communication device 114 is located in non-overlapping area 106 and communication device 116 is located in non-overlapping area 110. Further, communication device 118 is located in an intersection of overlapping area 108 and overlapping area 112. It will be apparent to those skilled in the art that environment 100 can comprise any number of base stations and communication devices. However, only two base stations (base station 102 and base station 104) and three communication devices (communication device 114, communication device 116 and communication device 118) are depicted in FIG. 1 for the sake of clarity.

In accordance with the present invention, communication between base stations and communication devices in environment 100 is based on OFDMA system, or any general Frequency Division Multiple Access (FDMA) system. In the OFDMA system, a communication is established between a base station and a communication device on an OFDMA frame. The OFDMA frame comprises a downlink frame and an uplink frame. For instance, base station 102 can transmit data to communication device 114 and communication device 118 on the downlink sub-frame. Similarly, base station 104 can transmit data to communication device 116 and communication device 118 on the downlink sub-frame. Those skilled in the art will appreciate that the downlink sub-frame may facilitate a multicast broadcast service (MBS) communication and/or unicast communication between a base station and a communication device. Further, communication device 114 and communication device 118 can transmit data to base station 102 on the uplink sub-frame and communication device 116 and communication device 118 can transmit data to base station 104 on the uplink sub-frame.

In the OFDMA system, base station 102 and base station 104 can use a plurality of segments for communication with communication device 114, communication device 116 and communication device 118. Each segment is a portion of a frequency allocated to a base station to communicate with communication devices in the cell area of the base station. For the sake of clarity, the OFDMA system is assumed to comprise three segments first segment, second segment and third segment, hereinafter. However, those skilled in the art will realize that any number of segments can be used for communication in the OFDMA system, and all such embodiments are within the scope of the present invention. Further, each segment comprises a plurality of sub-channels that are used for uplink and downlink transmission. A set of sub-channels is hereinafter referred to as a region. The method of managing communication between a base station and one or more communication devices in the cell area of the base station is explained in detail in conjunction with FIG. 2 to FIG. 5 below.

Figure 2:
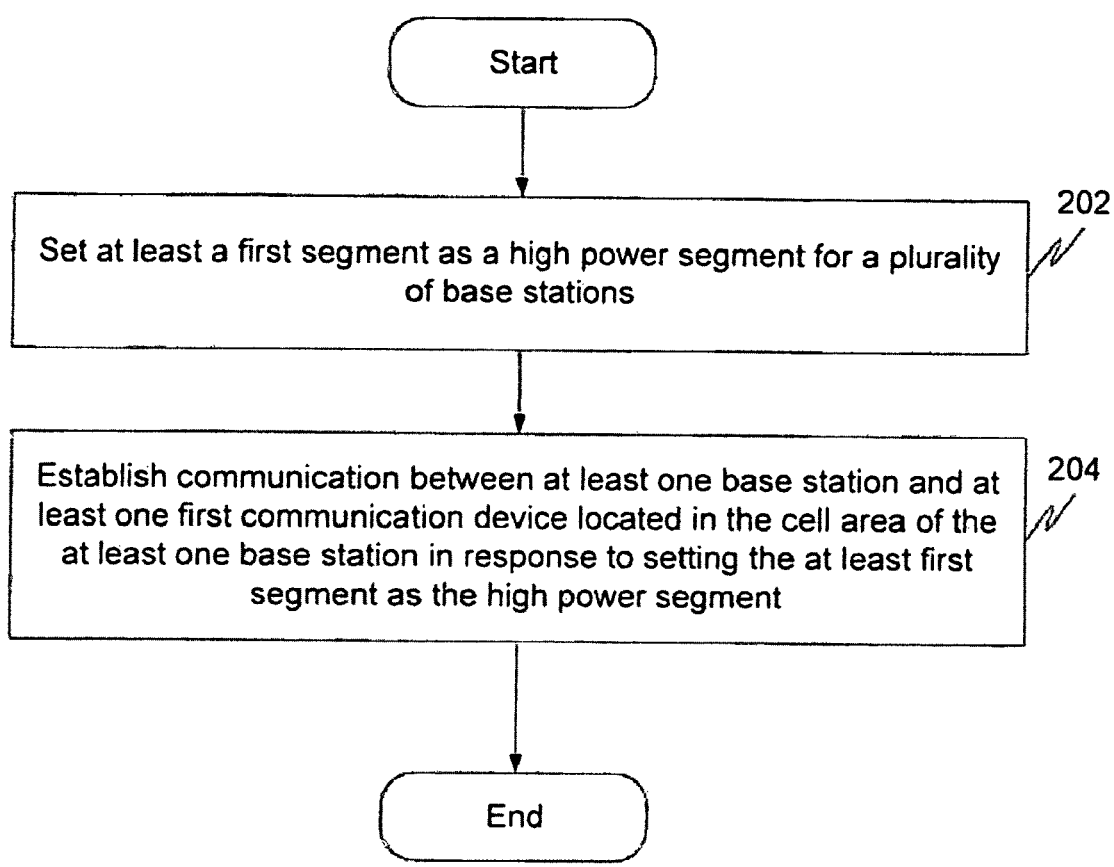
FIG. 2 is a flow diagram of a method for managing communication in an orthogonal frequency division multiple access (OFDMA) system, in accordance with an embodiment of the present invention.

FIG. 2 is a flow diagram of a method for managing communication in an OFDMA system, in accordance with an embodiment of the present invention. As mentioned earlier in conjunction with FIG. 1, base station 102 services non-overlapping area 106 and overlapping area 108, and base station 104 services non-overlapping area 110 and overlapping area 112. Further, each base station is configured to use a segment at a high power level, so as to serve communication devices in the non-overlapping area as well as in the overlapping area. Also, each base station can use other segments in the OFDMA system at a low power level to serve only the non-overlapping areas.

In accordance with the present invention, at step 202, a first segment is set as a high power segment for a plurality of base stations in environment 100. Therefore, each of the plurality of base stations in environment 100 uses a same segment as a high power segment. Further, the plurality of base stations can use one or more segments other than the first segment at lower power level than the first segment.

Thereafter, at step 204, one or more base stations belonging to the plurality of base stations establish communication with one or more communication devices. Establishing communication between the one or more base stations and the one or more communication devices is described below in detail in conjunction with FIG. 3.

Figure 3:
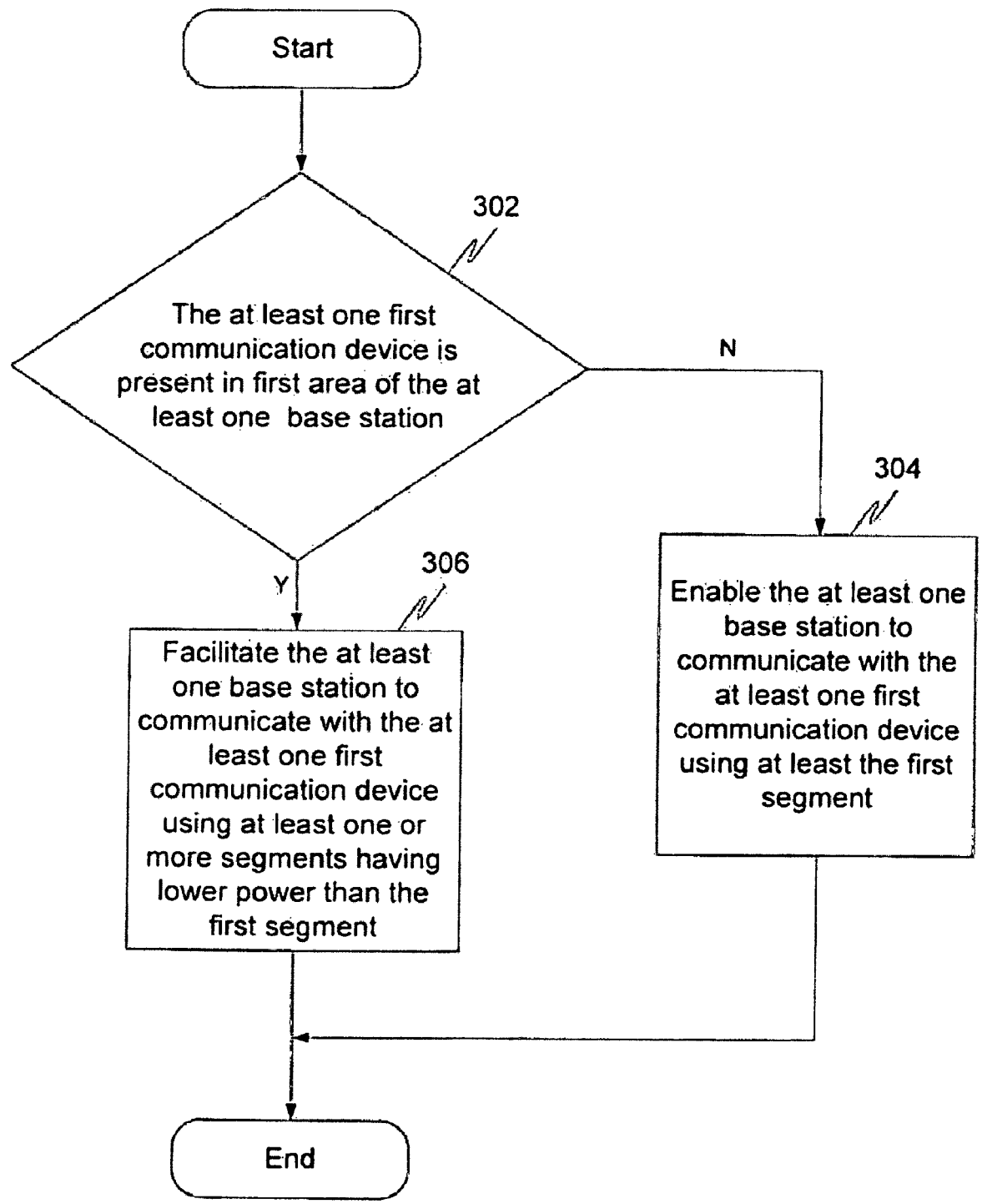
FIG. 3 is a flow diagram of a method for establishing a communication between a base station and one or more communication devices in an OFDMA system, in accordance to an embodiment of the present invention.

FIG. 3 is a flow diagram for establishing a communication between a base station and one or more communication devices in an OFDMA system, in accordance to an embodiment of the present invention. In accordance with FIG. 3, a cell area of a base station comprises a first area and a second area. The first area is the non-overlapping area mentioned earlier and the second area is the overlapping area mentioned earlier.

As described in FIG. 2, the first segment is set as the high power segment for the plurality of base stations in the OFDMA system. Accordingly, the one or more base stations can establish communication with the one or more communication devices located in the overlapping area of the one or more base stations using the first segment. However, other segments can be used by the one or more base stations to communicate with communication devices in the non-overlapping areas of the one or more base stations.

At step 302, a check is performed to determine if a communication device is located in the first area of a base station. This is typically done using ranging information from the communication device over the uplink sub-frame. If the communication device is located in the second area, that is the overlapping area of the base station, then at step 304, a communication is enabled between the base station and the communication device using the first segment. Similarly, one or more base stations communicate with one or more communication devices located in the second area of the one or more base stations using the first segment which operates at high power level. For instance, base station 102 and base station 104 communicate with communication device 118 using the first segment at a high power level. It will be apparent to a person skilled in the art that the first segment can also be used to communicate with communication devices in the first area.

Referring back to step 302, if the communication device is located in the first area of the base station, then at step 306, a communication is facilitated between the base station and the communication device using one or more segments having lower power than the first segment. Similarly, one or more base stations communicate with one or more communication devices located in the first area of the one or more base stations using one or more segments which operate at a lower power level than the first segment. For instance, base station 102 can establish communication with communication device 114 using any of the first segment, the second segment and the third segment. Similarly, base station 104 can establish communication with communication device 116 using any of the first segment, the second segment and the third segment.

One embodiment of the present invention supports the multi-base station MBS communication. For this purpose, all regions of the first segment can be set to a predetermined power level during a MBS portion of the OFDMA frame. The predetermined power level may be a high power level. This enables a communication device in the second area of the base station to receive MBS data from two to more base stations at the same time. For instance, communication device 118 can receive MBS data from base station 102 and from base station 104 simultaneously. This can improve signal strength of the MBS communication and has better efficiency that a single-base station MBS communication.

Another embodiment of the present invention can support scalability. For this purpose, power level of a predetermined number of segments may be increased to a predetermined power level. This enables efficient communication even when the number of communication devices in the OFDMA system is more than the number of communication devices that can be supported by the first segment. For instance, for the MBS communication, base station 102 and base station 104 can use the first segment, the second segment and the third segment at a high power level so as to provide MBS communication for more communication devices than would usually be possible.

Yet another embodiment of the present invention supports Macro Diversity Handover (MDHO). Since, adjacent base stations use the first segment at a high power level, communication devices in second area of the adjacent base stations can communicate with any or both of the adjacent base stations. Further, signals received from both of the adjacent base stations can be merged using any diversity-combining techniques known in the art, to obtain a stronger signal over the air. MDHO also enables continuous uplink and downlink transmission with the communication device, while the communication device is moving from one cell area to another cell area due to usage of same segment as the high power segment.

Figure 4:
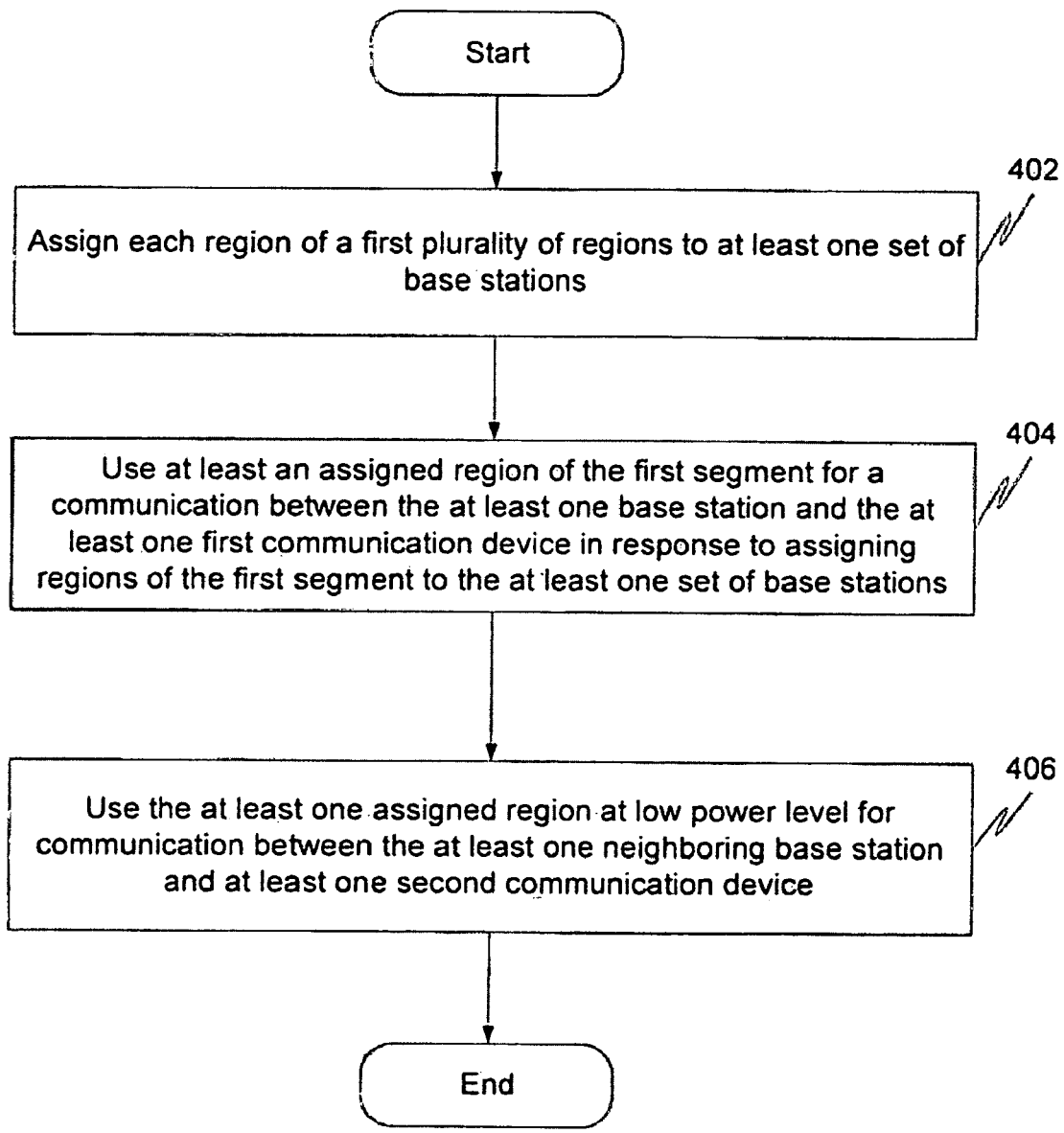
FIG. 4 is a flow diagram of a method for enabling abase station to communicate with one or more communication devices in a second area of the base station, in accordance to an embodiment of the present invention.

FIG. 4 is a flow diagram for enabling a base station to communicate with one or more communication devices in a second area of the base station, in accordance to an embodiment of the present invention. As mentioned earlier, the OFDMA system comprises a plurality of segment that can be used from communication between base stations and communication devices.

A first segment belonging to the plurality of the segments is set as a high power segment for the plurality of base stations. The first segment comprises a first plurality of regions. Each region of the first plurality of regions is a set of sub-channels of the first segment. At step 402, each region of the first plurality of regions is assigned to a set of base stations. A set of base stations can comprise the base stations that have cell areas that do not overlap with each other. In other words, the base stations in the set of base stations have minimum interference with each other. There can be more that one set of base stations. For instance, in the OFDMA mode of IEEE802.16 d/e, there are three sets of base stations, each set using a different segment at high power level for communication. However, in accordance with the present invention, instead of assigning an entire segment to a set of base stations, a region of the first segment can be assigned to a set of base stations.

Thereafter, at step 404 at least an assigned region is used for a communication between a base station and one or more communication devices located in the cell area of the base station. Those skilled in the art will realize that the base station can use the second segment and the third segment at a low power level to communicate with communication devices in the first area, that is the non-overlapping area, and the assigned region of the first segment to communicate with communication devices in the second area, that is the overlapping area. In an embodiment of the invention, the base station increases the power level of the assigned regions to a threshold power level. The threshold power level may be, for example, minimum power level required for communication between the base station and the communication devices in outer boundary of the second area. Similarly, each base station in the OFDMA system can communicate with communication devices located in the second area of the base station by using the region assigned to the base station.

The communication may be established using the assigned region of the first segment for any one of downlink transmission or uplink transmission. Specifically, the assigned region can be used for unicast communication between the plurality of base stations and the plurality of the communication devices. However, those skilled in the art will appreciate that the plurality of base stations can use the entire first segment for MBS communication, as, for MBS communication, there is no interference between the base stations.

Moreover, if the one or more communication devices are located in the first area of the base station, then the base station can establish communication with the one or more communication devices using one or more segments having lower power than the first segment. Thereby, the base station communicates with the one or more communication devices located in the first area using one or more segments, which operate at a power level lower than that of the first segment. The communication may be either an uplink transmission or a downlink transmission.

At step 406, the assigned region can be used by one or more neighboring base stations to communicate with the one or more communication devices in the first area of the one or more neighboring base station. For this purpose, the power level of the assigned region assigned to the base station is reduced for the one or more neighboring base stations.

For instance, when base station 102 uses a region of the first segment assigned to base station 102 for either the downlink transmission or the uplink transmission with communication device 118, base station 104 can use that region at a low power level to communicate with communication device 116. Base station 104 can, however, simultaneously use another region assigned to base station 104 at a high power level to communicate with other communication devices in the second area, overlapping area 112, of base station 104. This enables minimization of interference in both, the uplink transmission and downlink transmission.

Further, if communication device 118 located in overlapping area 108 of base station 102 uses the assigned region of base station 102 for downlink and uplink transmissions, then base station 104 can simultaneously use the assigned region of base station 102 for downlink and uplink transmissions with communication device 116 located in non-overlapping area 110. This results in reduced interference in downlink and uplink transmission as, at any particular time instance, a region assigned to a set of base stations is used only by the communication devices located in the second area of the set of base stations, while the one or more neighboring base stations use the region assigned to the set of base stations for uplink transmission with communication devices located in the first area of the one or more neighboring base stations.

Figure 5:
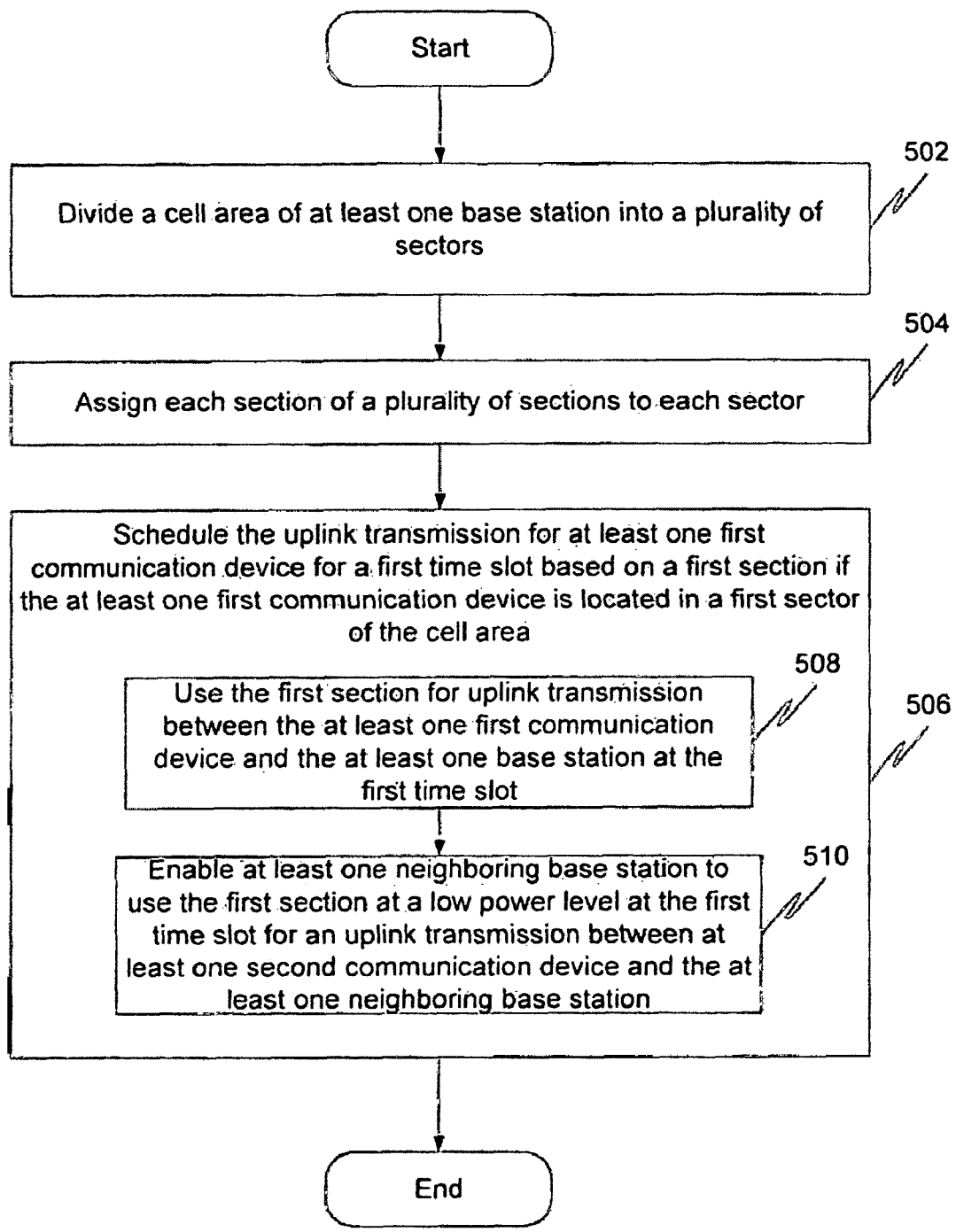
FIG. 5 is a flow diagram of coordinating an uplink transmission in an OFDMA system, in accordance to an embodiment of the present invention.

Turning now to FIG. 5, a flow diagram for coordinating an uplink transmission in an OFDMA system is shown, in accordance to an embodiment of the present invention. A plurality of base stations in the OFDMA system can use a plurality of segments at varying power levels to communicate with a plurality of communication devices in the OFDMA system. For instance, base station 102 may use a first segment at a high power level, so as to communicate with one or more communication devices in overlapping area 108 corresponding to base station 102. However, during uplink transmission, if communication device 118 transmits on the first segment, then there can be uplink interference at base station 104. This is because base station 104 may be using the first segment at a low power level for uplink transmission from communication devices in non-overlapping area 110.

To reduce the uplink interference, a cell area of a base station is virtually divided into a plurality of sectors, at step 502. For instance, referring back to FIG. 1, cell area of base station 102 is divided into sector 120, sector 122, sector 124, sector 126, sector 128 and sector 130. Also, cell area of base station 104 is divided into sector 132, sector 134, sector 136, sector 138, sector 140 and sector 142. FIG. 1 shows six sectors for each of base station 102 and base station 104, however, it shall be appreciated by those skilled in the art that a cell area of a base station may be virtually divided into any number of sectors, based on a scanning report of the cell area. Further, environment 100 depicts a case where one base station is surrounded by six base stations. Hence, a portion of a sector of a base station can overlap with a portion of a sector of a neighboring base station. For instance, sector 120 of base station 102 overlaps with sector 142 of base station 104.

After the cell area of the base station is divided into the plurality of sectors, each sector is assigned a section of a first segment at step 504. The section belongs to a plurality of sections of the first segment. Specifically, each segment of the OFDMA system can be divided into a plurality of sections and each section can be assigned to a sector of a base station. The base station can use the sections of the plurality of segments assigned to a sector for uplink transmissions from communication devices in that sector.

For instance, a first section of the first segment can be assigned for uplink transmission from communication devices in sector 142 to base station 104. Similarly, a second section of the first segment can be used for uplink transmission from communication devices in sector 140 to base station 104, and so on.

Thereafter, an uplink transmission from one or more communication devices located in a sector is scheduled for a first time slot, at step 506. The uplink transmission between the one or more communication device and the base station is scheduled using the section of the first segment assigned to the sector in which the one or more communication devices are located, at step 508. The information about the location of the one or more communication devices can be obtained from ranging information or a scanning report corresponding to the cell area of the base station. For instance, at a first time slot, the first section of the first segment assigned to sector 142 can be used for uplink transmission from communication device 118.

Further, at step 510, one or more neighboring base stations can use the first section of the first segment simultaneously, that is at the first time slot, for an uplink transmission from communication devices in the first sector corresponding to the one or more neighboring base stations.

For instance, at the first time slot, base station 104 can schedule an uplink transmission for communication device 118 located in sector 142 on the first section of the first segment. Base station 102 can schedule a simultaneous uplink transmission for communication device 114 located in sector 126 using the first section of the first segment.

In an embodiment of the present invention, the uplink transmission for the plurality of sectors in a cell area can be scheduled in a round-robin manner. For instance, communication devices in sector 142 and in sector 126 can be scheduled at a first time slot using a first section of a first segment. At a second time slot, communication devices in sector 140 and sector 124 can be scheduled for uplink transmission using a second section of the first segment, and so on.

In another embodiment of the present invention, one or more sets of base stations can use different segments at a high power level. In this embodiment, when a base station schedules an uplink transmission for communication devices in a first sector using a first section of the first segment at a high power level, a neighboring base station can use a first section of a second segment at a high power level for an uplink transmission from communication devices in a first sector corresponding to the neighboring base station. For instance, base station 104 may use first segment at a high power level and base station 102 may use second segment at high power level. Uplink transmission for communication device 118 can be scheduled at a first time slot using the first section of the first segment. However, at the same time slot, one or more communication devices in the overlapping area of sector 126 can be scheduled for uplink transmission using a first section of the second segment. Those skilled in the art will realize that at the first time slot, base station 104 can schedule uplink transmissions for communication devices in the non-overlapping area 110 using the second segment or any segment other than the first segment.

It will be appreciated by those skilled in the art that at a particular time instance, since only communication device 118 and communication devices in the non-overlapping area of the first sectors of one or more neighboring base stations use the first section of the first segment, the possibility of uplink interference is minimized.

Figure 6:
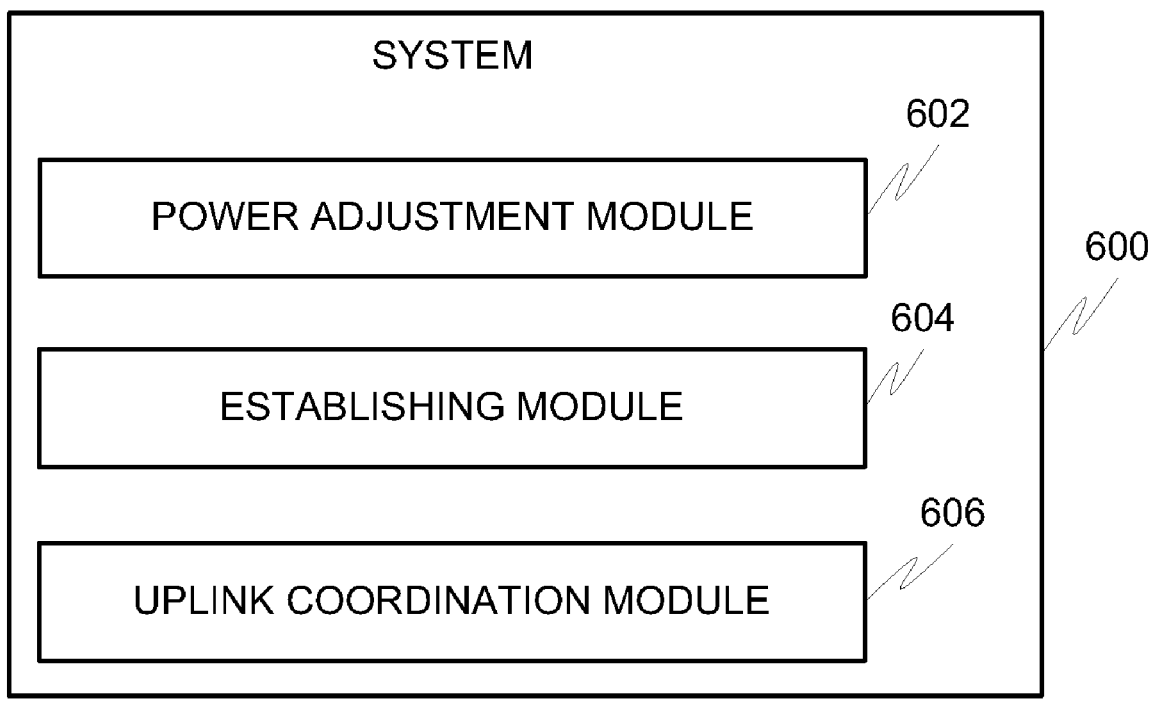
FIG. 6 is a block diagram showing various components of a system for managing communication in an OFDMA system, in accordance with an embodiment of the present invention.

Turning now to FIG. 6, a block diagram of a system 600 for managing communication in an OFDMA system is shown, in accordance with an embodiment of the present invention. System 600 comprises a power adjustment module 602 and an establishing module 604. Power adjustment module 602 can set a first segment belonging to a plurality of segments in the OFDMA system as a high power segment. In an embodiment of the present invention, system 600 can communicate with a plurality of base stations in the OFDMA system so as to enable the plurality of base stations or at least a predetermined number of base stations to set the first segment at a high power level. Those skilled in the art will realize that the plurality of base stations can configure their antennas to transmit and receive signals on the first segment at a high power level.

In response to power adjustment module 602 setting the first segment as the high power segment, establishing module 604 establishes communication between a base station and one or more communication devices located in the cell area of the base station. The communication may be downlink transmission or uplink transmission. Further, the downlink transmission may be a MBS communication or a unicast communication.

For establishing communication between the base station and a communication device, establishing module 604 determines if a communication device is located in a first area or a second area of the base station. If the communication device is located in the first area of the base station, that is the non-overlapping area, establishing module 604 establishes communication with the communication device using one or more segments having power lower than the first segment. If the communication device is located in the second area of the base station, that is the overlapping area, establishing module 604 establishes communication with the communication device using the first segment. The communication may be a MBS communication.

For the MBS communication, the plurality of base stations can use all of a plurality of regions of the first segment at a high power level during the downlink sub-frame. Specifically, a communication device on an overlapping area or a second area of a base station can receive MBS data from two or more base stations simultaneous, resulting in a multi-base station MBS communication.

Further, power adjustment module 602 can request the plurality of base stations to increase the power level or each of the plurality of segments to the high power level during the MBS communication for supporting scalability. Furthermore, as mentioned earlier, the usage of a single segment at a high power level can result in MDHO.

In an embodiment of the present embodiment, establishing module 604 assigns each region of the first plurality of regions of the first segment to a set of base stations. If the communication device is located in the second area of the base stations, establishing module 604 enables the base station to establish communication with the communication device using a region of the first segment assigned to the base station. The communication may be downlink transmission or uplink transmission.

In an embodiment of the invention, power adjustment module 602 increases the power level of the assigned region to a threshold power level. The threshold power level may be for example a minimum power level required for communication between the base station and the communication device.

Further, power adjustment module 602 can request one or more neighboring base stations of the base stations to reduce the power level for the assigned region of the base station. Consequently, the one or more neighboring base stations can use the assigned region of the base station for communicating with communication devices located in the first areas of the neighboring base stations. However, for communicating with communication devices in the second areas of the one or more neighboring base stations, power adjustment module 602 can increase a power level of the regions of the first segment assigned to the one or more neighboring base stations.

Moreover, for coordinating the uplink transmission in an OFDMA system, system 600 may further comprise an uplink coordination module 606. Uplink coordination module 606 is configured to divide the cell area of the base station, virtually, into a plurality of sectors. For instance, referring back to FIG. 1, cell area of base station 102 is divided into sector 120, sector 122, sector 124, sector 126, sector 128 and sector 130. Also, cell area of base station 104 is divided into sector 132, sector 134, sector 136, sector 138, sector 140 and sector 142.

Uplink coordination module 606 assigns a section of a first segment to each sector. Similarly, uplink coordination module 606 may assign sections of other segments to each sector corresponding to each of the plurality of base station. The section belongs to a plurality of sections of a segment. The base station can use the sections of the plurality of segments assigned to a sector for uplink transmissions from communication devices in that sector. Assigning of a section to a sector of a base station is explained in detail in conjunction with FIG. 5 above.

Thereafter, uplink coordination module 606 schedules an uplink transmission from one or more communication devices located in a sector for a first time slot. The uplink transmission between the one or more communication device and the base station is scheduled using the section of the first segment assigned to the sector in which the one or more communication devices are located. The information about the location of the one or more communication devices can be obtained from a ranging information or a scanning report corresponding to the cell area of the base station. System 600 can receive the scanning report or the ranging information from either a plurality of communication devices or a plurality of base stations in the OFDMA system. The scheduling of the uplink transmission is explained in detain in conjunction with FIG. 5 above.

Further, uplink coordination module 606 can be configured to schedule the uplink transmission for the plurality of sectors in the cell area in a round-robin manner.

It will be appreciated by those skilled in the art that, at a particular time instance, when a communication device in a overlapping area of a first sector is scheduled for uplink transmission using a first section of a first segment, communication devices in the non-overlapping area of the first sectors of one or more neighboring base stations can use the first section of the first segment. Thus, the possibility of uplink interference is minimized.

In an embodiment of the present invention, system 600 can reside on a central controller of the OFDMA system. In another embodiment of the present invention, system 600 can reside on one or more base stations of the OFDMA system. In yet another embodiment of the present invention, either of power adjustment module 602 and establishing module 604 can reside on one or more base stations and on the central controller. Further, those skilled in the art will realize that system 600 can be configured to communicate with the plurality of base stations in the OFDMA system.

Various embodiments of the present invention provide a method and system for reducing interference in an OFDMA system. Further, the various embodiments of the present invention provide a method and system that support multi-base station MBS communication and MDHO in the OFDMA system. In addition, the various embodiments of the present invention provide a method and system for facilitating scalability in the OFDMA system. Moreover, the present invention provides a method for coordinating uplink transmission in the OFDMA system in order to reduce uplink interference.

What is claimed is:

1. A method of managing communication in an orthogonal frequency division multiple access (OFDMA) system, the method comprising:
   setting use of at least a first segment belonging to a plurality of segments of an OFDMA frame as a high power segment for a plurality of base stations to communicate with at least one first communication device in the OFDMA system;
   determining if the at least one first communication device is present in one of a first area and a second area of each of the plurality of base stations, the first area and the second area belonging to a cell area of each of the plurality of base stations;
   if the at least one first communication device is present in the first area, facilitating the each of the of the plurality of base stations to communicate with the at least one first communication device using at least one or more segments belonging to the plurality of segments, wherein the at least one or more segments have a lower power than the first segment; and
   if the at least one first communication device is present in the second area,
      assigning each region of a first plurality of regions belonging to the first segment to at least one set of base stations, wherein the at least one set of base stations belongs to the plurality of base stations, and wherein the at least one first communication device is located in a cell area of the at least one set of base stations; and
      using at least an assigned region of the first segment for a communication between the at least one set of base stations and the at least one first communication device, wherein the communication being a unicast communication.

2. The method of claim 1, wherein the first area of each of the of the plurality of base stations is a section of the cell area where overlapping with one or more cell areas of one or more neighboring base stations is absent, and the second area of each of the of the plurality of base stations is a section of the cell area where overlapping with the one or more cell areas of the one or more neighboring base stations is present.

3. The method of claim 1, wherein a power level of a predetermined number of segments belonging to the plurality of segments is increased to a predetermined power level, wherein the communication is at least a multicast broadcast service (MBS) communication.

4. The method of claim 2, wherein at least one neighboring base station uses the assigned region of the at least one base station at a low power level.

5. The method of claim 4, wherein the assigned region of the at least one base station is used for a communication between the at least one neighboring base station and at least one second communication device, the at least one second communication device located in a first area corresponding to each of the at least one neighboring base station.

6. A method for coordinating an uplink transmission in an OFDMA system, the method comprising:
   dividing a cell area of at least one base station into a plurality of sectors;
   assigning each section of a plurality of sections to each sector of the plurality of sectors, wherein the plurality of sections belong to a first segment, and wherein the first segment belongs to a plurality of segments of an OFDMA frame in the OFDMA system; and
   if the at least one first communication device is located in a first sector of the cell area, scheduling the uplink transmission for at least one first communication device for a first time slot, wherein the uplink transmission is based on a first section of the first segment assigned to the first sector, the first section belonging to the plurality of sections.

7. The method of claim 6, wherein a location of the at least one first communication device is determined based on a scanning report corresponding to the cell area.

8. The method of claim 6, wherein scheduling the uplink transmission comprises:

using the first section of the first segment for the uplink transmission between the at least one first communication device and the at least one base station at the first time slot, wherein the first section is used at a high power level, the at least one first communication device located in at least one of a first area and a second area corresponding to the first sector of the cell area of the at least one base station; and enabling at least one neighboring base station to use the first section of the first segment at a low power level at the first time slot for an uplink transmission between at least one second communication device and the at least one neighboring base station, wherein the at least one second communication device is located in a first sector corresponding to the at least one neighboring base station.

9. The method of claim 6, wherein the scheduling step comprises scheduling an uplink transmission for the plurality of sectors of the at least one base station in a round-robin manner.

10. A system for managing communication in an orthogonal frequency division multiple access (OFDMA) system, the system comprising:

a power adjustment module, the power adjustment module configured for setting the use of at least a first segment belonging to a plurality of segments of an OFDMA frame as a high power segment for a plurality of base stations in the OFDMA system; and an establish module, the establishing module configured to
establish a communication between at least one base station and at least one first communication device in the OFDMA system based on a plurality of power levels corresponding to the plurality of segments, wherein the at least one first communication device is located in a cell area of at least one base station;

facilitate the at least one base station to communicate with the at least one first communication device using at least one or more segments if the at least one first communication device is located in the first area, wherein the one or more segments belong to the plurality of segments, the one or more segments having a lower power than the first segment; and enable the at least one base station to communicate with the at least one first communication device using at least the first segment if the at least one first communication device is located in the second area, wherein enabling the at least one base station to communicate comprises:

assigning each region of a first plurality of regions belonging to the first segment to at least one set of base stations, the at least one set of base stations belonging to the plurality of base stations, wherein the at least one first communication device is located in a cell area of the at least one set of base stations; and enabling the one base station in the at least one set of base stations to communicate with the at least one first communication device using assigned region of the first segment, wherein communication is a unicast communication.

11. The system of claim 10, wherein the establishing module is further configured for determining a location of the at least one first communication device based on a scanning report corresponding to the cell area.

12. The system of claim 10, wherein, for a MBS communication, the power adjustment module is configured for increasing a power level of a predetermined number of segments to a predetermined power level, the predetermined number of segments belonging to the plurality of segments.

13. The system of claim 10, wherein, for the unicast communication, the power adjustment module is further configured for:

increasing the power level of the assigned region of the at least one base station to at least a threshold power level; and, reducing the power level of the assigned region of at least one neighboring base station.

14. The system of claim 10 further comprising an uplink coordination module configured for:

dividing the cell area of the at least one base station into a plurality of sectors;

assigning each section of a plurality of sections to each sector of the plurality of sectors, the plurality of sections belonging to the first segment, the first segment belonging to a plurality of segments in the OFDMA system; and scheduling the uplink transmission for the at least one first communication device for a first time slot, if the at least one first communication device is located in a first sector of the cell area, wherein the uplink transmission is based on a first section of the first segment assigned to the first sector, the first section belonging to the plurality of sections.

15. The system of claim 14, wherein the uplink coordination module is further configured for:

using the first section of the first segment for the uplink transmission between the at least one first communication device and the at least one base station at the first time slot, wherein the first section is used at a high power level, the at least one communication device located in at least one of a first area and a second area corresponding to the cell area of the at least one base station; and enabling at least one neighboring base station to use the first section of the first segment at a low power level at the first time slot for an uplink transmission between at least one second communication device and the at least one neighboring base stations, wherein the at least one second communication device is located in a first sector corresponding to the at least one neighboring base station.

* * * * *